United States Patent [19]

Davis et al.

[11] Patent Number: 5,627,675

[45] Date of Patent: May 6, 1997

[54] OPTICS ASSEMBLY FOR OBSERVING A PANORAMIC SCENE

[75] Inventors: John E. Davis, Claremont; Marion N. Todd, Monrovia, both of Calif.; Mitchell Ruda, E. Hampton, Ariz.; Tilman W. Stuhlinger, Tucson, Ariz.; Kenneth R. Castle, Tuscon, Ariz.

[73] Assignee: Boeing North American Inc., Seal Beach, Calif.

[21] Appl. No.: 455,885

[22] Filed: May 13, 1995

[51] Int. Cl.$^6$ .......................... G02B 17/00; G02B 13/06
[52] U.S. Cl. .......................... 359/366; 359/724; 359/725; 359/729; 359/731
[58] Field of Search .................... 359/725, 724, 359/366, 729, 731; 354/94, 95; 352/69

[56] References Cited

U.S. PATENT DOCUMENTS

| | | | |
|---|---|---|---|
| 1,797,867 | 3/1931 | Karnes | 359/833 |
| 1,959,702 | 5/1934 | Barker | 340/524 |
| 2,244,235 | 6/1941 | Ayres | 359/504 |
| 2,297,345 | 9/1942 | Bowen | 359/731 |
| 2,430,595 | 11/1947 | Young | 359/731 |
| 2,638,033 | 5/1953 | Buchele et al. | 359/725 |
| 2,923,220 | 2/1960 | Bouwers | 354/96 |
| 3,151,524 | 10/1964 | Bouwers | 359/725 |
| 3,203,328 | 8/1965 | Brueggemann | 354/95 |
| 3,283,653 | 11/1966 | Tokarzewski | 359/725 |
| 3,404,934 | 10/1968 | Brachvogel et al. | 359/725 |
| 3,514,186 | 5/1970 | Poncelet | 359/664 |
| 3,552,820 | 1/1971 | Brachvogel | 359/364 |
| 3,781,559 | 12/1973 | Cooper et al. | 250/334 |
| 3,894,798 | 7/1975 | Wolf | 353/122 |
| 3,977,793 | 8/1976 | Trotta | 356/218 |
| 3,998,532 | 12/1976 | Dykes | 352/69 |
| 4,012,126 | 3/1977 | Rosendahl et al. | 359/725 |
| 4,226,501 | 10/1980 | Shafer | 359/366 |
| 4,241,390 | 12/1980 | Markle et al. | 359/366 |
| 4,395,093 | 7/1983 | Rosendahl et al. | 359/725 |
| 4,446,372 | 5/1984 | Gurnee | 250/334 |
| 4,463,357 | 7/1984 | MacDoran | 342/460 |
| 4,566,763 | 1/1986 | Greguss | 359/725 |
| 4,567,367 | 1/1986 | Brown de Colstoun et al. | 250/340 |
| 4,834,517 | 5/1989 | Cook | 359/366 |
| 4,977,323 | 12/1990 | Jehle | 250/332 |
| 4,994,670 | 2/1991 | Noble et al. | 250/235 |
| 5,049,756 | 9/1991 | Brown de Colstoun et al. | 250/554 |
| 5,160,842 | 11/1992 | Johnson | 250/338.1 |
| 5,170,284 | 12/1992 | Cook | 359/366 |

(List continued on next page.)

FOREIGN PATENT DOCUMENTS

| | | | |
|---|---|---|---|
| 878162 | 8/1971 | Canada | 329/725 |
| 222522 | 1/1990 | Japan | 250/358 |

*Primary Examiner*—Georgia Y. Epps
*Assistant Examiner*—Evelyn A. Lester
*Attorney, Agent, or Firm*—Lawrence N. Ginsberg; Charles T. Silberberg

[57] ABSTRACT

An optics assembly for observing a panoramic scene. The optics assembly includes a plurality of optical elements. A first element redirects light from the panoramic scene. The optical power of the first element forms an imaginary pupil. The energy from the first element is redirected about 90 degrees, forming an annular path. A second element receives the redirected light and re-images the imaginary pupil to form a real pupil. This portion of the energy continues to be in an annular form. A third element includes an optical relay system having a group of reimaging optics. The third element receives light from the second element while relaying the real pupil into the reimaging optics. It also establishes the focal length of the optics assembly, corrects pupil aberrations produced at the real pupil, corrects field aberrations and produces an annular image on a flat focal plane. The optical relay system interfaces with the second element through the use of the real pupil. The real pupil is formed at the cold stop and filter location in the third element. This pupil is relayed back through the system to be coincident with the first real pupil. The optics assembly produces a small F-number at field angles near perpendicular to the output optical axis of the optics assembly over a panoramic scene.

15 Claims, 5 Drawing Sheets

U.S. PATENT DOCUMENTS

| | | | |
|---|---|---|---|
| 5,173,801 | 12/1992 | Cook | 359/366 |
| 5,181,145 | 1/1993 | Eden | 359/366 |
| 5,218,345 | 6/1993 | Muller et al. | 340/578 |
| 5,281,815 | 1/1994 | Even-Tov | 250/339.04 |
| 5,309,276 | 5/1994 | Rodgers | 359/366 |
| 5,363,235 | 11/1994 | Kiunke et al. | 359/366 |
| 5,402,168 | 3/1995 | Fouilloy | 348/164 |
| 5,477,395 | 12/1995 | Cook | 359/366 |
| 5,515,207 | 5/1996 | Foo | 359/731 |
| 5,550,672 | 8/1996 | Cook | 359/729 |

OPTICS ASSEMBLY FOR OBSERVING A PANORAMIC SCENE

BACKGROUND OF THE INVENTION

1. Field of the Invention

This invention relates to optical systems, and more, particularly, to optical systems for imaging panoramic scenes onto flat focal planes.

2. Description of the Related Art

Existing wide field sensors do not combine an efficient optical system providing a large numerical aperture, a panoramic format with azimuth capability to 360 degrees and elevation coverage both above and below the horizon, with a focal plane format capable of supporting a single square or rectangular focal plane. Fish eye lenses and their derivatives have grossly distorted pupils as the field angle increases. The larger field angles of the fish eye lenses can have a pupil providing less than ten percent of the pupil area of the central system. This yields significant distortion and reduction in sensitivity. The resultant systems providing similar performance are thus relatively large and costly.

U.S. Pat. No. 4,994,670, issued to M. Noble et al, describes a dither scanned, multiple aperture panoramic sensor.

Canadian Patent No. 878,162, issued to D. Rees, describes a panoramic viewing system using a television system.

U.S. Pat. No. 4,395,093, issued to G. Rosendahl et al., describes a pair of hyperbolic reflective surfaces, which are used to image onto a complex arrangement of refractive elements to perform color correction and field corrections.

U.S. Pat. No. 4,012,126, issued to G. Rosendahl et al., discloses a panoramic optical system with a pair of hyperbolic reflective surfaces, which are used to image onto a complex arrangement of refractive elements to perform color corrections and field corrections.

U.S. Pat. No. 3,203,328, issued to H. Brueggemann, discloses a device in which the optical path includes a hyperbolic surface followed by a spherical surface. The focal plane configuration necessitated by this optical path requires an annular focal plane. The energy traveling from the primary to the spherical secondary optics passes through the center of the focal plane. This prevents the concept from being used with conventional focal planes.

U.S. Pat. No. 3,781,559, issued to E. Cooper et al., discloses a procedure for scanning a field with various fields of view.

U.S. Pat. No. 3,283,653, issued to A. R. Tokarzewski, discloses an all refractive design with many complex annular lens shapes, including conical sections.

U.S. Pat. No. 2,638,033, issued to D. R. Buchele, describes a refractive concept in which light rays pass across the prime axis of the initial optics. The invention has an exit pupil. There is only one significant optically powered surface for producing the image.

U.S. Pat. No. 3,552,820, issued to H. Brachvogel, describes a refractive first element set, which then directs energy to a re-imaging group.

U.S. Pat. No. 1,797,867, issued to J. C. Karnes discloses panoramic or omniscope optics, which includes, as the first element, a convex/concave element. This approach has significant problems producing a resolved image and pupil. The implementation of a focal plane region is a dispersed toroidal section which does not support an economical focal plane arrangement.

U.S. Pat. No. 2,244,235, issued to W. A. Ayres, describes a reflective spherical first element. This approach results in unacceptable distortion. The higher angles of elevation are very foreshortened on the focal plane, while the lower angles of elevation are severely limited in azimuthal resolution.

U.S. Pat. Nos. 2,923,220 and 3,151,524, issued to A. Bouwers, disclose inventions having wide angle camera lenses.

U.S. Pat. No. 3,514,186, issued to E. F. Poncelet, has deficiencies that are similar to that of the W. A. Ayres (U.S. Pat. No. 2,244,235) invention. Poncelet's first element is a sphere with the image refracted through it. Ayres' first element, on the other hand, is a reflecting sphere.

U.S. Pat. No. 3,894,798, issued to J. Wolfe, discloses a scanning invention.

U.S. Pat. No. 3,998,532, issued to W. Dykes, discloses a projection device for use with film.

U.S. Pat. No. 4,566,763, issued to P. Greguss, discloses an imaging block similar to that of Buchele (U.S. Pat. No. 2,638,033).

U.S. Pat. No. 5,402,168, issued to J. Fouilloy, discloses a camera concept which entails an optomechanical projector and scanning system.

U.S. Pat. No. 3,977,793, issued to P. Trotta, .discloses a scanning radiation energy receiver.

Japanese Patent No. 63-172209, issued to Y. Tamagawa, describes a procedure for limiting the off axis radiation to an infra red detector.

U.S. Pat. No. 4,446,372, issued to M. Curnee, discloses a detector cold shield.

SUMMARY OF THE INVENTION

The present invention is an optics assembly for observing a panoramic scene. The optics assembly includes a plurality of optical elements. A first element redirects light from the panoramic scene. The optical power of the first element forms an imaginary pupil. The energy from the first element is redirected about 90 degrees, forming an annular path. A second element receives the redirected light and re-images the imaginary pupil to form a real pupil. This portion of the energy continues to be in an annular form. A third element includes an optical relay system having a group of reimaging optics. The third element receives light from the second element while relaying the real pupil into the reimaging optics. It also establishes the focal length of the optics assembly, corrects pupil aberrations produced at the real pupil, corrects field aberrations and produces an annular image on a flat focal plane. The optical relay system interfaces with the second element through the use of the real pupil. The real pupil is formed at the cold stop and filter location in the third element. This pupil is relayed back through the system to be coincident with the first real pupil. The optics assembly produces a small F-number at field angles near perpendicular to the output optical axis of the optics assembly over a panoramic scene.

The first element preferably comprises a convex surface, and the second element preferably comprises a concave surface. These first and second elements most preferably comprise a Mersenne optic.

The present invention provides almost constant pupil size as a function of elevation angle. This enables high efficiency energy collection with low geometric distortion in elevation field angle and panoramic capability up to 360°. The result provides a small F-number. As used herein, the term "F-number" refers to the focal length divided by the effective aperture. The term "small" refers to an F-number less than 1.5.

The present invention provides a compact optical format with high potential spatial resolution. It allows the use of conventional focal planes, either as single units, reading out the entire panoramic scene, or utilizing multiple focal planes, each reading out a segment of the scene, while not requiring that the focal planes be closely abutted, nor that multiple apertures be required, nor that mechanical or optical elements need to be moved to provide a scanning system to cover the field of regard. The use of a staring panoramic sensor allows significant improvements in the method of processing the information received by the optics. The collection of photons from the target can be made very close to full time, making the efficiency of the system very high. The effective dwell time of the pixels of the focal plane assembly can be made exceptionally long through the use of on chip and off chip integration.

All embodiments of the invention include multiple surfaces for correcting optical distortions in the image. These surfaces provide improved resolution and field flattening at the focal plane.

Unlike the device disclosed in U.S. Pat. No. 4,994,670, the present invention does not require a dither system to produce the scanned image. The present invention can be a true starring sensor with excellent frame to frame registration for frame differencing and background and fixed pattern noise rejection as well as multiple frame integration for reduction of random noise. The present invention does not require multiple apertures to cover the panoramic scene. It does not require slits in conjunction with a focal plane array to produce the total image. The present invention can be used in both the visible and/or the infra red. It possesses an annular energy bundle throughout the entire optical path. A single focal plane may be used to display the entire field of regard.

Unlike the device disclosed in Canadian Patent 878,162, the present invention does not have a refractive element in the initial panoramic element. The present invention does not require multiple reflections internal to a single refractive element. It does have application to both the infra red spectrum in addition to the visible spectrum whereas the Canadian Patent discloses use with a television camera or visible viewing screen.

Unlike the device disclosed in U.S. Pat. No. 4,395,093, the present invention is intended primarily as a sensor, rather than a projector. The present invention does not require hyperbolic surfaces. Furthermore, the present invention may operate in the infrared as well as the visible wavelengths.

Unlike the device disclosed in U.S. Pat. No. 3,203,328, the present invention is capable of operating with cooled detectors. The present: invention can make use of a single, flat, detector array of conventional design.

Unlike the device disclosed in U.S. Pat. No. 3,283,653, the present invention can be embodied as a broad band, chromatically compensated device for use in both visible and infrared wavelengths. It is capable of being implemented with cooled focal planes.

Unlike the device disclosed in U.S. Pat. No. 2,638,033, the present invention deals with the problems inherent in providing a flat image plane after a pupil. The current invention utilizes reflective optical elements for the panoramic elements instead of the refractive elements of the '003 patent. The '033 patent does not address the thermal isolation required of an infrared sensor or the spectral compensation required to observe a broad spectral band, since there is no correction indicated for spectral compensation.

Unlike the device disclosed in U.S. Pat. No. 3,552,820, the present invention does not rely on the refractive index of the material to turn a transmissive surface reflective. The present invention utilizes reflective elements for the panoramic elements.

Use of the Mersenne optical pair is particularly advantageous because the optical elements are individually testable and the pair yields superior resolution. Additionally, the Mersenne pair presents a well behaved exit pupil stop to enhance infrared sensitivity by minimizing internal and off axis radiation susceptibility.

Utilization of optics having only reflective surfaces provides extremely broad spectral capabilities for use in broadband spectrometers or broad-band radiometers.

The optics assembly of the present invention collects energy from a panoramic scene, collected from the visible or infrared spectrum, and may present the imaged data for analysis or action against targets or threats. This sensor is a staring system, which results in a very efficient temporal collection mode with high dwell time.

Other objects, advantages and novel features of the present invention will become apparent from the following detailed description of the invention when considered in conjunction with the accompanying drawings.

BRIEF DESCRIPTION OF THE DRAWINGS

The same elements or parts throughout the figures are designated by the same reference characters.

DETAILED DESCRIPTION OF THE PREFERRED EMBODIMENT

Figure 1:
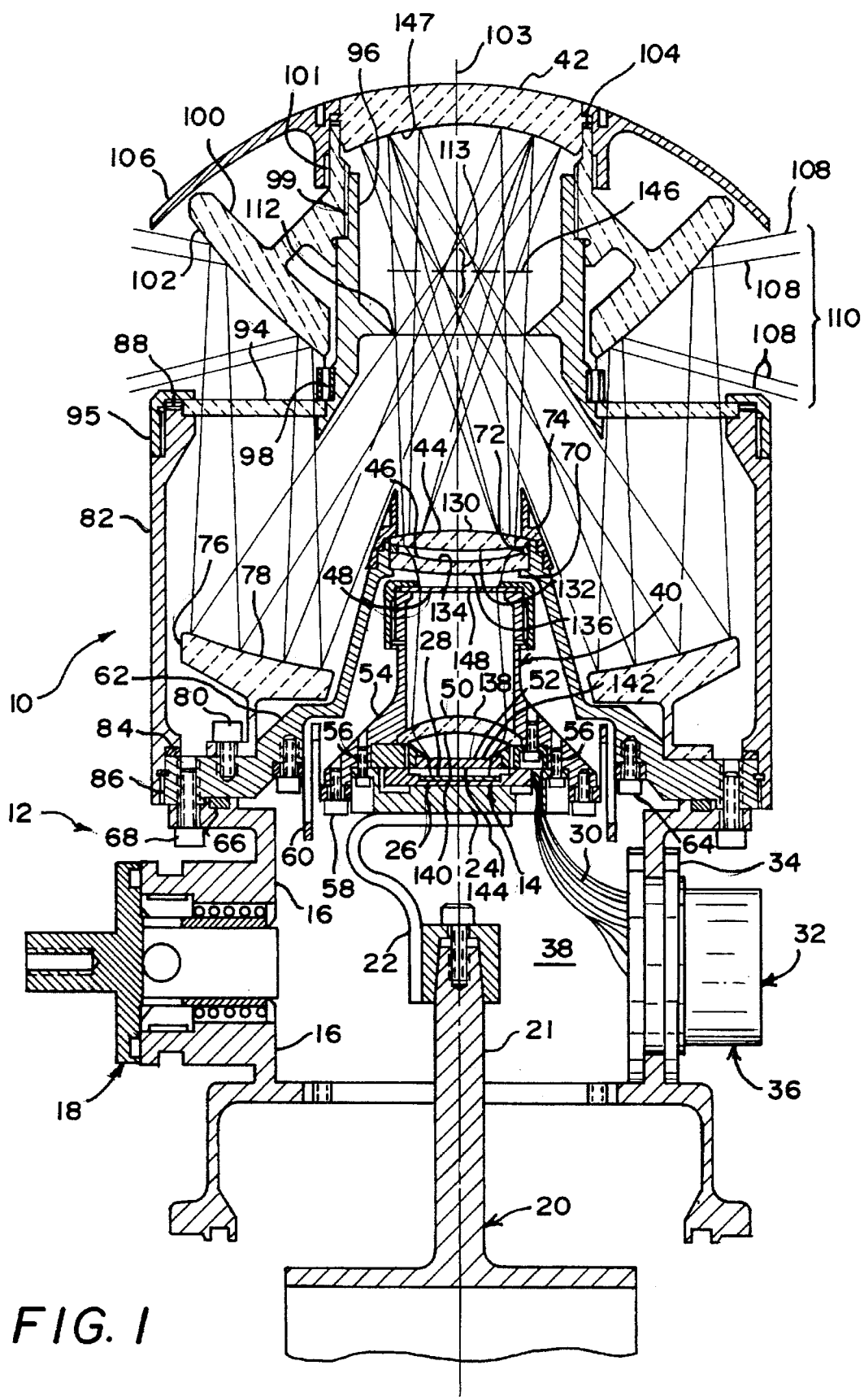
FIG. 1 is a diagrammatical, cross-sectional illustration of the arrangement and association of elements of a first embodiment of an optics assembly incorporating the subject invention therein, in relation to the optical functions thereof.
Figure 2:
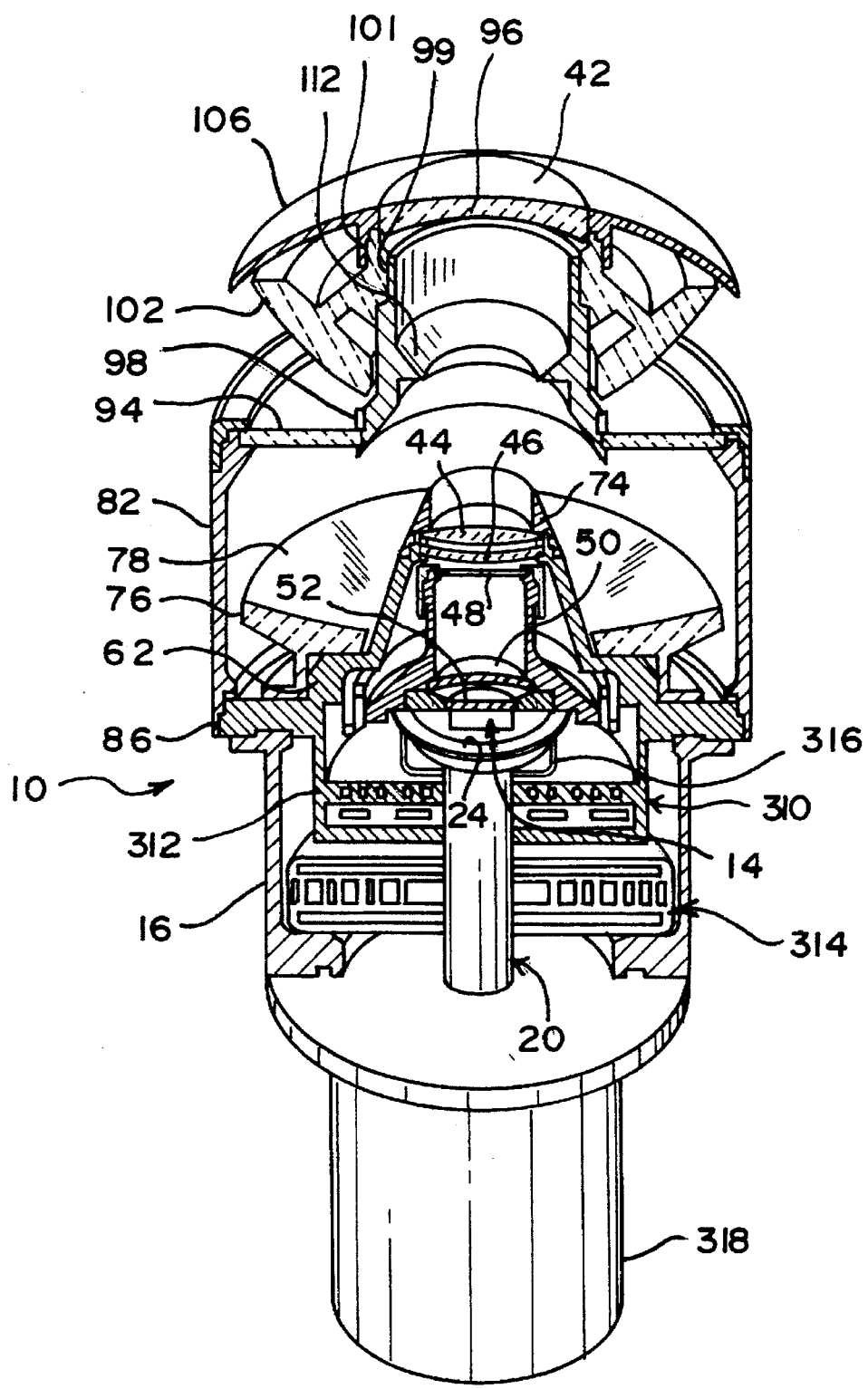
FIG. 2 is a perspective illustration of the embodiment of FIG. 1, shown assembled.

Referring now to the drawings and to the characters of reference marked thereon, FIGS. 1 and 2 illustrate a preferred embodiment of the present optics assembly of the present invention, designated generally as 10. Optics assembly 10 is supported by a support structure assembly, designated generally as 12. The optics assembly 10 supports a focal plane assembly designated generally as 14.

The support structure assembly 12 serves as an interface between the optics assembly 10 and the gimbal, vehicle, ship structure, aircraft structure, fixed pole, or other mounting fixture. Support structure assembly 12 includes a support structure 16. Support structure 16 is connected to a vacuum port assembly, designated generally as 18. Such vacuum port assemblies 18 are well known in the field and commercially available. A cooler assembly 20 is attached to the support structure 16 by an interface with an o-ring and bolts (not shown) to close out the vacuum housing of the support structure 16. An optional ion pump (not shown) may be connected to the support structure 16 to maintain the vacuum within the support structure 16. A cooler cold finger 21, a portion of the cooler assembly 20, is connected to the focal plane assembly 14 by means of a cold strap 22. A terminal end of the cold strap 22 is connected to a focal plane holder 24. The focal plane holder 24 supports a focal plane mount 26. Focal plane mount 26, in turn, supports the focal plane 28. Focal plane 28 may be, for example, visible or infrared. If it is visible, the cooling and vacuum, referenced earlier, are not required. Wires (not shown) connect the focal plane 28 to associated pads (also not shown) in the focal plane mount 26. Wires 30 are connected to the pads at one end and to the electrical feed-through connector assembly 32 at the other end. The electrical feed-through connector assembly 32 includes a locking ring 34 and a connector 36. Electrical feed-through connector assembly 32, therefore, provides electrical biases, clocks, outputs, and grounds feed-through from high vacuum space 38 to the external environment.

The above discussion has provided a description of the support structure assembly 12 and focal plane assembly 14. The description now turns to the optics assembly, which is the emphasis of the present invention.

The optics assembly 10 includes a cooled optic subassembly, designated generally as 40. Cooled optical subassembly 40 provides mechanical registration and alignment between the focal plane 28 and the optical relay assembly sub-elements of an optical relay system. The optical relay system comprises a series of optical sub-elements, designated 42, 44, 46, 48, 50 and 52, as will be discussed in detail below. The exact number of these sub-elements varies with the specific design. Cooled optical subassembly 40 establishes the alignment between the focal plane 28, the last optical relay sub-element 52, the next to the last optical relay sub-element 50 and the cold stop and band pass filter optical relay element 48. The optical relay sub-elements 48, 50, 52, are kept cold by conduction through a cooled housing 54 of the cooled optical subassembly 40. Housing 54 limits the off-axis radiation observed by the focal plane 28 by enclosing the entire view outside of the optical elements with a cold, low emissive and reflective surface and by placing a cold pupil stop at the entrance to the cold cavity. Housing 54 is connected to the focal plane holder 24 via bolts 56.

Bolts 58 connect the housing 54 to a thermal isolator 60. Thermal isolator 60 maintains the mechanical position of the optical relay sub-elements 48, 50, 52 of the cooled optical subassembly 40 stationary relative to the remaining sub-elements 42, 44, and 46, of the optical relay system. A vacuum close-out 62 is attached to the thermal isolator 60 by bolts 64. The outer periphery of the vacuum close-out 62 is connected to the support structure 16 via the 0-ring 66 and bolts 68. The connection between the support structure 16 and the vacuum close-out 62 provides an ambient thermal path for the optical components of the optics assembly 10.

The vacuum close-out 62 provides mechanical alignment and spacing of optical relay sub-elements 44 and 46 relative to focal plane 28. A seal 70 is provided between optical sub-element 46 and the upper portion of the vacuum close-out 62 to complete the total vacuum enclosure. A spacer 72 is inserted between, n optical sub-elements 44 and 46 and a screw retainer 74 holds the optical sub-elements ,14 and 46 in the desired secured and aligned positions. An optical element 76 with a concave surface 78 is connected via bolts 80 to the vacuum close-out 62. The vacuum close-out 62 provides the optical alignment between the optical relay sub-elements 44, 45, 50, 52 and the focal plane 28 to the second optical element 76.

A cylindrical optical support 82 is connected via a spacer 84 and threads 86 to the lower peripheral edge of the vacuum close-out 62. The optical support 82 provides alignment of the lower portion of the optics assembly 10 relative to the upper portion of the optics assembly 10. A centering device 88 is provided at the upper end of the optical support 82 to provide centering of the upper optical sub-elements to the lower optical sub-elements of the optics assembly 10. Centering device 88 is a tapered ring which is cut to the desired offset of the top optical elements, 100 and 42, to the optical axis generated by the bottom optical elements 78, and sub-elements 44 and 46. The rotational axis of the tapered ring is aligned to the desired axis of the offset. This centering device 88 and optical support element 94 are held in place by the threaded fitting 95.

Support window 94 provides a close-out in the optical path between the optical support 82 and the upper optical support 96. Upper optical support 96 is connected to the support window 94 by a threaded fitting and ring nut 98. Upper optical support 96 has an externally threaded upper portion 99 for attaching an optical element 100 with a convex surface 102.

Optical relay element 42 is connected to optical element 100 by adjustable spacer 104. Optical relay element 42 is captured to optical element 100 by means of a clamp ring 106, which is threaded onto optical element 100 by threads 101.

During operation the incoming energy from the panoramic scene with an elevation angle from about −15 degrees to about +15 degrees represented by numeral designations 108 enters the aperture 110 and is reflected by the first element, i.e. optical element 100, the optical power of optical element 100 forming an imaginary pupil 113 behind the reflecting surface 102 of optical element 100 on the vertical axis 103 of the sensor. Surface 102 reflects the energy downward through the window 94. The energy is then reflected by the concave mirror 78 of a second optical element, i.e. optical element 76, to the tertiary surface, i.e. the lower surface 1 of sub-element 42 of a third element The third element comprises sub-element 42 and a group of reimaging optics 44, 46, 48, 50, 52. The second element 76 re-images the imaginary pupil 113. In passing through the window 94, the energy is limited in its field by an inward radially extending protrusion of the upper optical support 96. As the energy travels between the secondary 76 and the tertiary 42 it passes a field stop 112 and the imaginary pupil 113. All of the internal support surfaces are preferably provided with optically black surfaces to minimize internal reflections. The energy passes through the relayed imaginary pupil 113, which is the location of the real pupil 146. The real pupil 146 is in turn relayed to the second surface 148 of the filter and cold stop 48. The relayed image is labeled 148. The field stop 112 also limits the energy field angles on the descending path from element 42 to element 44. As the energy passes from element 76 to element 42, it also passes the threaded baffle 74. Baffle 74 limits the off axis incoming radiation which would normally strike the first surface of the optical element 44. It is also black to minimize the internal reflections of the optical system. The internal surfaces of the cold mount 54 are both cold and black to minimize internal reflections and to provide a low emission surface for the off-axis view of the focal plane.

The outside of the cold optical assembly 40 is covered with a gold flash to minimize radiation absorption from the warm structure 62, which is also covered by a gold flash to minimize radiative transfer.

The energy from the tertiary surface 42 travels to the optical elements 44 and 46 which forms a closely spaced doublet then to cold defining pupil stop lyot stop, at the entrance to the cold optics. The alignment of these parts is held in tight alignment with the cold optical elements 50 and 52 by the mechanical path through the vacuum close out 62, the thermal isolator 60 and the cold optical housing 54. The energy is focused on the focal plane 26 by the cold doublet comprising optical elements 50, 52.

Figure 3:
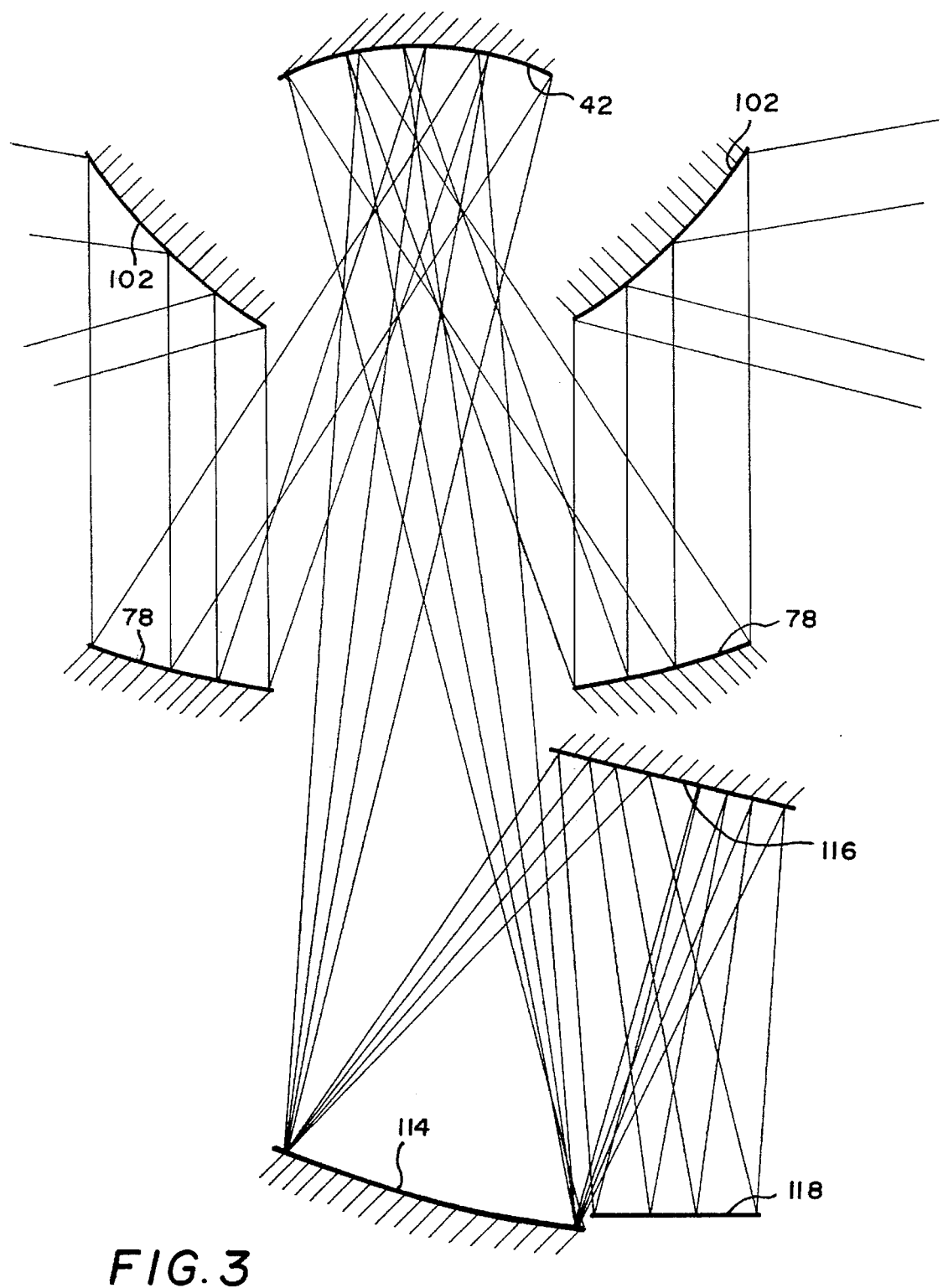
FIG. 3 is a schematic diagrammatical illustration of the optical arrangement for a second embodiment of the present invention in which all optical surfaces are reflective.

It is noted that FIG. 3 deletes certain elements shown in FIG. 1, for the purpose of clarity. These elements include the centering device 88, spacer 84, screw 68, screw 80, vacuum port assembly 18, spacer 104, screw 64, wires 30, locking ring 34, electrical feed through connector assembly 32 and connector 36. FIG. 2, on the other hand, shows electronics 310 for driving the focal plane and buffering the output of the focal plane. FIG. 2 also shows the drive electronics 312 for the ion pump 314, a cold shield 316, which prevents radiation to the focal plane area from the electronics 310, and a cryo engine 318. Cryo engine 318 is commercially available by, for example, British Aerospace Company.

FIG. 3 illustrates an embodiment of the optics assembly of the present invention with an all reflective reemerging optics arrangement. The elements 44, 46, 48, 50, and 52 are replaced with an off axis reflecting element 114. This element provides a focusing beam to the fold mirror element 116. The energy from element 116 is focused at the focal plane 118 in the same manner that energy is focused on the focal plane 26 of FIG. 1.

The specific advantage of this approach is that a broad spectral region can be accommodated with no lateral color or imaging blur.

The following figures describe the predicted performance of a low resolution sensor having a 256×256, 40 micron pixel array, and a high resolution sensor having a 1024× 1024, 18 micron pixel array. The physical size of the sensor, the number of transmissive elements and the aperture are optimized for each array configuration described below.

Figure 4:
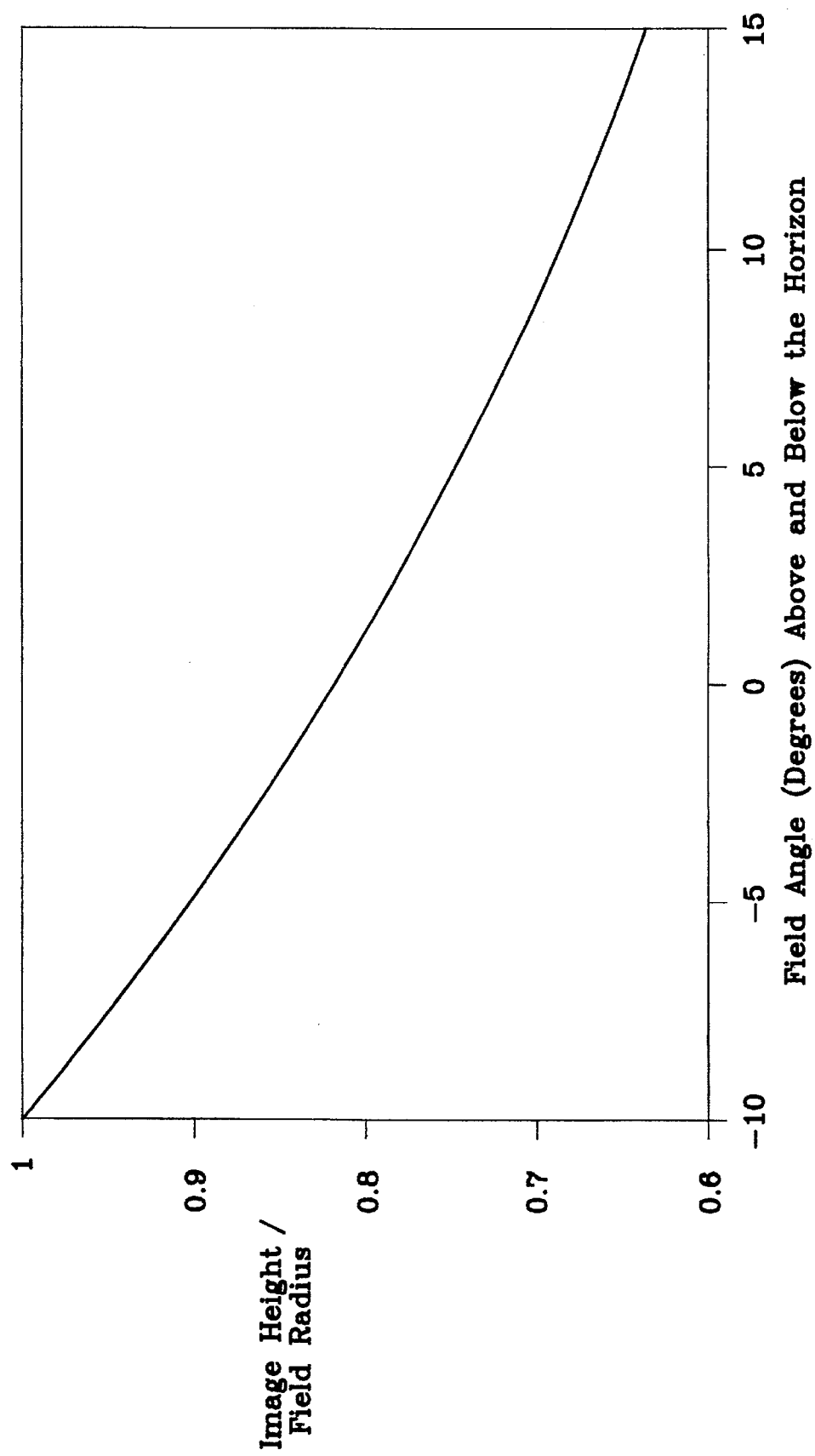
FIG. 4 is a graph of image height (inches) vs. field-of-view angle (degrees) as predicted from a ZEMAX computer program for a 256×256 sensor.

FIG. 4 demonstrates the predicted image height versus the field-of-view angle as predicted by ZEMAX, a commercially available computer optical design program. The variation of image height as a function of full field radius for a 25° field about the horizon is markedly better than a conventional fish eye lens designed to cover a panoramic scene. Image is defined at the focal plane 26. This improvement yields a significantly greater number of active pixels over the 25° field of regard, as well as greater uniformity and instantaneous field-of-view over the field of regard.

Figure 5:
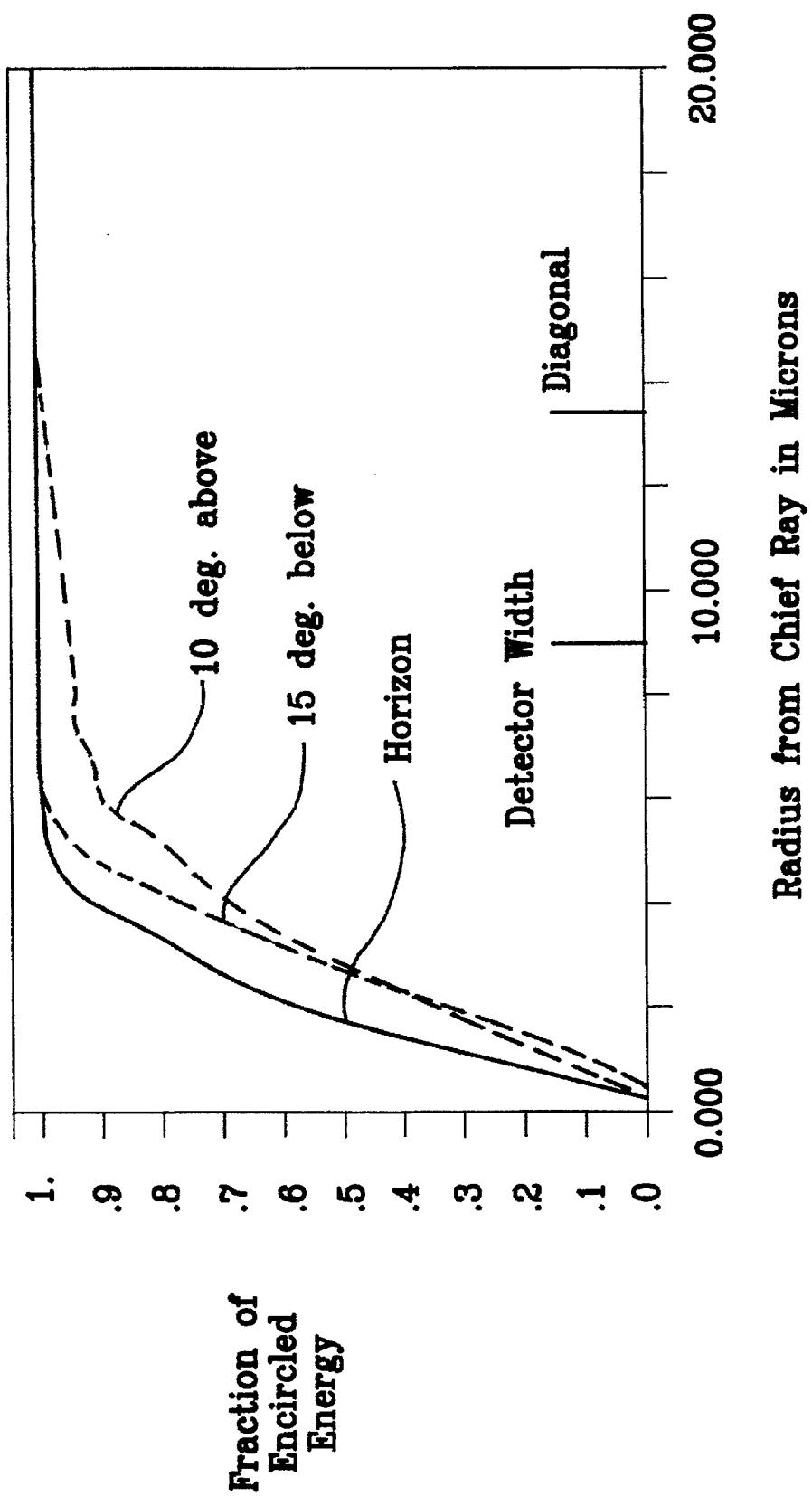
FIG. 5 is a graph of the fraction of encircled energy versus radius from centroid (microns), illustrating the polychromatic and geometric encircled energy.

FIG. 5 shows the predicted function of encircled energy for +15°, 0°, and −15° observations as a function of radius from the image centroid. These polychromatic encircled energy plots are computed using ZEMAX computer software for a 256 pixel wide field of view. This figure shows that a characteristic Airie disk will be smaller than 10 microns diameter. This is established at the 82% encircled energy level. The spot will fill about 1/16th of the typical pixel area.

The following table illustrates an example of an implementation of an optics assembly designed in accordance with the principles of the present invention:

TABLE

| Elements | Curvature | Space | Thickness |
| --- | --- | --- | --- |
| Mirror 1 102 | −1.3 | −2.45 | |
| Mirror 2 78 | +5.2 | 3.60 | |

TABLE-continued

| Elements | Curvature | Space | Thickness |
| --- | --- | --- | --- |
| Mirror 3 147 | −0.48 | −2.86 | |
| L1 S1 130 of 44 | 2.31 | | 0.12 |
| L1 S2 132 of 44 | −3.34 | 0.078 | |
| L2 S1 134 of 46 | −1.39 | | 0.071 |
| L2 S2 136 of 46 | −2.15 | 0.917 | |
| L3 S1 138 of 50 | +0.64 | | 0.119 |
| L3 S2 140 of 50 | +1.20 | 0.137 | |
| L4 S1 142 of 52 | −1.99 | | 0.054 |
| L4 S2 144 of 52 | INFINITY | 0.059 | |
| Focal Plane | | | |
| All in inches | | | |

It is understood that the inventive concept described herein is applicable over a wide range of sizes and IFOV's (instantaneous field-of-views, or pixel resolutions). If the F/# is held constant, the size of the collecting optics is determined by the physical size of the focal plane array (FPA). The IFOV resolution of the optical system is determined by the number of pixels in the annular plane. For convenience, the equivalents of area-to-focal plane inscribed diameter is used. If the $256^2$ FPA has a nominal IFOV of 8 milliradians, then a $1024^2$ FPA will have an IFOV of $256/1024$ or ¼ of that of the 256, or in other words, a 2 milliradian IFOV.

Size is directly proportional to the FPA width, and resolution is inversely proportional to the number of pixels in the inscribed diameter. The complexity (i.e., number of pixels) of the relay is also inversely proportional to the resolution but in a stepwise manner.

For example, going from 8 milliradian IFOV to 2 milliradian IFOV requires six lenses instead of four lenses to correct aberrations to below the new resolution requirement. The addition of two or more aspheric surfaces on the lenses could accomplish the same function. The six lens relay is sufficient for a FOV below 1 milliradian. In quantity, for even higher resolution systems, a relay of six lenses with some aspheric elements is feasible. The difference in size of the $1024^2$ and the $256^2$ collecting optics is 1.85 to 1, the $1024^2$ being the larger. The relay optics size can vary depending on the desired form factor (i.e. long or short back focal distances to accommodate additional mechanisms) or to conform to packaging constraints.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An optics assembly for observing a panoramic scene, comprising:
   a plurality of optical elements, comprising:
      a first element for re-directing light in an annular geometry from said panoramic scene, optical power of said first element forming an imaginary pupil;
      a second element for receiving said annularly re-directed light and for re-imaging said imaginary pupil to form a real pupil; and
      a third element comprising:
         a) a sub-element having a curved reflecting surface thereon for receiving light from said second element, and
         b) an optical relay system for receiving light being reflected from said sub-element, said optical relay system including a group of reimaging optics, said third element for:
i) relaying said real pupil into said reimaging optics,
ii) establishing a focal length of the optics assembly,
iii) correcting pupil aberrations produced at said real pupil,
iv) correcting field aberrations, and
v) producing an annular image on a flat focal plane, wherein said optics assembly produces a small F-number at field angles near perpendicular to an output optical axis of the optics assembly over a panoramic scene.

2. The optics assembly of claim 1, wherein said first element comprises a convex surface and said second element comprises a concave surface.

3. The optics assembly of claim 1, wherein said first and second elements comprise a Mersenne optic, said first element being a convex parabolic mirror and said second element being a concave parabolic mirror.

4. The optics assembly of claim 1, wherein said optical relay system comprises a combination of refractive and reflective elements.

5. The optics assembly of claim 1, wherein said group of reimaging optics comprises a cold stop and band pass filter for receiving said relayed real pupil.

6. The optics assembly of claim 1, wherein said optical relay system comprises only reflective elements.

7. An optics assembly for observing a panoramic scene, comprising:
a plurality of optical elements, comprising:
a first element for re-directing light in an annular geometry from said panoramic scene, optical power of said first element forming an imaginary pupil;
a second element for receiving said annularly re-directed light and for re-imaging said imaginary pupil to form a real pupil; and
a third element comprising an optical relay system including a group of reimaging optics, said third element for:
i) receiving light from said second element while relaying said real pupil into said reimaging optics,
ii) establishing a focal length of the optics assembly,
iii) correcting pupil aberrations produced at said real pupil,
iv) correcting field aberrations, and
v) producing an annular image on a flat focal plane,
said optical relay system comprising a combination of refractive and reflective elements,
wherein said optics assembly produces a small F-number at field angles near perpendicular to an output optical axis of the optics assembly over a panoramic scene.

8. The optics assembly of claim 7, wherein said first element comprises a convex surface and said second element comprises a concave surface.

9. The optics assembly of claim 7, wherein said first and second elements comprise a Mersenne optic, said first element being a convex parabolic mirror and said second element being a concave parabolic mirror.

10. An optics assembly for observing a panoramic scene, comprising:
a plurality of optical elements, comprising:
a first element for re-directing light in an annular geometry from said panoramic scene, optical power of said first element forming an imaginary pupil;
a second element for receiving said annularly re-directed light and for re-imaging said imaginary pupil to form a real pupil; and
a third element comprising an optical relay system including a group of reimaging optics, said third element for:
i) receiving light from said second element while relaying said real pupil into said reimaging optics,
ii) establishing a focal length of the optics assembly,
iii) correcting pupil aberrations produced at said real pupil,
iv) correcting field aberrations, and
v) producing an annular image on a flat focal plane,
said group of reimaging optics comprising a cold stop and band pass filter for receiving said relayed real pupil,
wherein said optics assembly produces a small F-number at field angles near perpendicular to an output optical axis of the optics assembly over a panoramic scene.

11. The optics assembly of claim 10, wherein said first element comprises a convex surface and said second element comprises a concave surface.

12. The optics assembly of claim 10, wherein said first and second elements comprise comprise a Mersenne optic, said first element being a convex parabolic mirror and said second element being a concave parabolic mirror.

13. An optics assembly for observing a panoramic scene, comprising:
a plurality of optical elements, comprising:
a first element for re-directing light in an annular geometry from said panoramic scene, optical power of said first element forming an imaginary pupil;
a second element for receiving said annularly re-directed light and for re-imaging said imaginary pupil to form a real pupil; and
a third element comprising an optical relay system including a group of reimaging optics, said third element for:
i) receiving light from said second element while relaying said real pupil into said reimaging optics,
ii) establishing a focal length of the optics assembly,
iii) correcting pupil aberrations produced at said real pupil,
iv) correcting field aberrations, and
v) producing an annular image on a flat focal plane,
wherein said optical relay system comprises only reflective elements, and,
wherein said optics assembly produces a small F-number at field angles near perpendicular to an output optical axis of the optics assembly over a panoramic scene.

14. The optics assembly of claim 13, wherein said first element comprises a convex surface and said second element comprises a concave surface.

15. The optics assembly of claim 13, wherein said first and second elements comprise a Mersenne optic, said first element being a convex parabolic mirror and said second element being a concave parabolic mirror.

* * * * *